May 1, 1951

D. R. ANDREWS 2,550,753

ERASING HEAD FOR MAGNETIC RECORDERS

Filed June 22, 1949

INVENTOR
DALLAS R. ANDREWS
BY Morris A. Rabin
ATTORNEY

Patented May 1, 1951

2,550,753

UNITED STATES PATENT OFFICE 2,550,753

ERASING HEAD FOR MAGNETIC RECORDERS

Dallas R. Andrews, Collingswood, N. J., assignor to Radio Corporation of America, a corporation of Delaware Application June 22, 1949, Serial No. 100,675

5 Claims. (Cl. 179—100.2)

This invention relates to magnetic sound-recording systems and has special reference to the provision of an improved method of and apparatus for putting a magnetic record in a condition to receive a magnetic signal by electromagnetically obliterating or erasing any signal or any "noise" already on the record.

The erasing heads now used in magnetic sound-recording and reproducing machines usually comprise an electromagnet of the same construction as the electromagnets used in the recording and reproducing heads. In fact, it is common practice to employ a single magnet, in conjunction with a suitable switching system, for performing more than one of the said functions. In any event, if the recording magnet in a particular machine has its pole pieces disposed on opposite sides of the record, either (1) in register with each other (to provide "perpendicular" magnetization) or (2) off-set from each other (to provide "transverse" magnetization), or (3) when the pole pieces are disposed longitudinally in spaced relation on the same side of the record (to provide "longitudinal" magnetization), then the erasing head ordinarily has its pole pieces disposed in the same way with respect to the record.

The present invention is predicated upon an appreciation of the fact that this standard practice of employing a conventional recording or reproducing head for erasing purposes may result in faulty erasing and, in any event, is quite inefficient. That this is so will be appreciated from a consideration of what takes place when a conventional tape or wire record is passed over the copper-filled gap of a conventional single-ended erasing head. When alternating erasing-current is passed through the electromagnet of a conventional erasing head the magnetic flux arches (in the form of an inverted U) over the copper insert, due to eddy current effect, and the record, instead of passing through a "solid cloud" of flux, passes through two discrete narrow flux-bands (i. e., through, instead of between, the arms of the above-mentioned inverted U). The usual practice is to employ an erasing frequency of approximately 100 kilocycles and, at this frequency, considerable power must be employed to provide a sufficient number and intensity of lines of force in the divided flux path for adequate erasing. If, in an attempt to reduce eddy current losses, the copper insert were to be omitted from a conventional erasing head, the flux would pass directly between the ends of the pole pieces without adequately penetrating the record or the sound-track thereon. Furthermore, in operating a conventional magnetic phonograph there is dry friction between the magnetic record and the recording, reproducing and erase heads. The stresses thus set up in the record are of a recurrent nature and produce undesired frequency modulation or "wows" on the sound track.

Accordingly, the principal object of the present invention is to provide a frictionless and noise-free method of putting a magnetic record in condition to accept a magnetic signal, and one which lends itself effectively to the erasing of a sound track containing longitudinally extending, permanently magnetized, signal-bearing areas and random noise.

Another and related object of the invention is to provide an improved electromagnetic erasing head, and one having a dual erasing action upon the magnetic record to which its magnetic field is applied.

The foregoing and other objects are achieved in accordance with the present invention, by the provision of a transducer comprising a bi-part magnetic structure having a longitudinal axis and a pair of longitudinally offset pole portions at each end thereof. The gap between each pair of poles is unencumbered by any non-magnetic insert and is of width greater than the thickness dimension of the magnetic record which the erasing head is designed to serve. Accordingly, in practicing the method of the invention the record may be passed, longitudinally, first through one and then through the other of said gaps out of frictional contact with both pairs of pole portions.

The improved performance of the double-ended transducer of the present invention results not only from its dual erasing action, and from the absence of friction, but also from the fact that the lines of force to which the record is twice exposed is not split or bowed, as it is in a conventional head, but comprises a "solid" stream of flux which, in flowing between the offset pole pieces, spans a greater area of the sound track than would be the case if the pole pieces were in register with each other.

Other objects and advantages, together with certain preferred details of construction and operation, will be apparent and the invention itself will be best understood upon reference to the following specification and to the accompanying drawing, wherein.

Figures 1, 2:
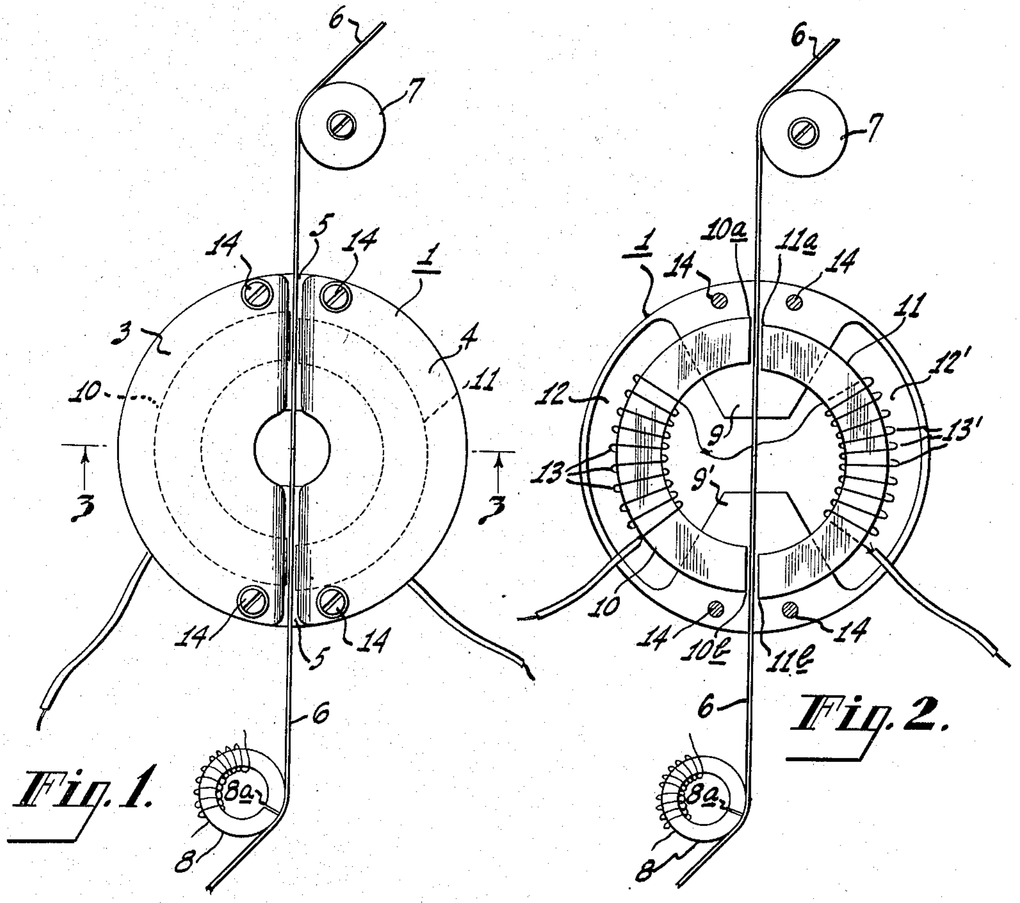
Fig. 1 is a top plan view of an erasing head constructed in accordance with the present invention and showing the path therethrough of the record which is to be erased.
Fig. 2 is a view similar to Fig. 1 but with the cap of the head removed to reveal the magnetic structure of the head.

In the drawing, wherein like reference characters designate the same parts in all figures, 1 designates generally a hollow casing or housing constituted of brass or other non-magnetic material within which the several components of the erasing head are mounted. In the instant case the housing comprises a cup-shape base 2 and a cover consisting of two parts 3 and 4 mounted in spaced-apart relation on opposite sides of the longitudinal axis of the casing to provide a slot 5 through which the reelable magnetic record 6 may be entered into the interior of the unit. The reelable record, here shown, comprises a flexible insulating film or tape provided on one of its surfaces with a powdered metal sound-track, though it may comprise either a solid steel band or wire. Two guide members 7 and 8, disposed on opposite sides of the casing 1, serve to maintain the record 6 in a straight path in register with the longitudinal axis of the casing. The guide member 8 comprises a recording head in the form of an electromagnet having a non-magnetic gap 8a over which the de-magnetized record runs upon emerging from the erasing head. As is well understood, when the recording magnet 8 is energized with alternating current corresponding to the voice, music, or other "signal," the record 6 becomes endowed with a series of longitudinally extending, permanently magnetized areas (not shown) which, upon being moved past an electromagnetic pick-up device (not shown) causes an A.-C. voltage to be set up therein. The picked-up voltage, after amplification, can be rendered audible by a loudspeaker (not shown).

As previously mentioned, when the recording magnet 8 is of the type that imparts "longitudinal" signals to the record, the practice has been to employ a similar single-ended magnet for erasing purposes and to run the record over the non-magnetic gap between the polar extremities of said magnet. The present invention teaches that more thorough and efficient erasing is achieved by the use of a double-ended magnet arranged with its paired polar portions disposed on opposite sides of the record and offset from each other along the path of the record. The housing 1 contains such a magnet.

Figure 3:
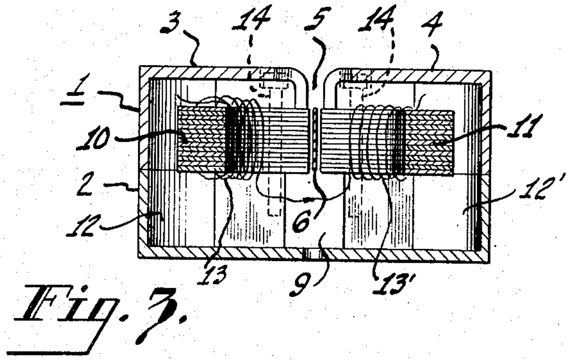
Fig. 3 is a plan view taken on the line 3—3 of Fig. 1.

As shown more clearly in Figs. 2 and 3, the base 2 of the housing 1 is cut away on its interior to provide two pedestals or risers 9 and 9'; one at each end of the longitudinal axis of the housing, beneath the slot 5. These oppositely located risers 9 and 9' serve as supports for the separate C-shape parts 10 and 11 of a bi-part magnetic core.

In accordance with the invention the separate parts 10 and 11 of the magnetic core are disposed on opposite sides of the longitudinal axis, along which the record travels, with the polar extremities 10*a*, 10*b* of one C-shape part offset, longitudinally, from the corresponding polar extremities 11*a*, 11*b* of the other part. Thus, the record 6 in its journey through the housing 1 passes successively between both pairs (10*a*—11*a*, 10*b*—11*b*) of magnetic poles and is twice subjected to an alternating erasing field. The dual erasing action of the head or transducer, of the present invention, upon a longitudinally magnetized sound-track is especially effective because the magnetic flux has a diagonal component with respect to the signals upon the track and is not diverted or dissipated by the presence of a non-magnetic spacer between the pole faces of the magnet. Should the sound track contain "noise" of a random nature, the perpendicular and diagonal components of the flux streams ensure complete erasing. Furthermore, since the spacing between the core parts 10 and 11 is sufficient to permit the record to pass without contacting any of the polar faces of the core, dry friction and resulting wear, frequency modulation and "wows" are eliminated. The cut-away parts 12, 12' of the base, between the risers 9 and 9', provide clearance spaces within which the series connected coils 13 and 13' on the core parts 10 and 11 are accommodated. The core parts are preferably but not necessarily of laminated construction, as shown in Fig. 3, and are maintained in their above described longitudinally-offset position on the risers 9 and 9' by the clamping action exerted upon the end or polar portions 10*a*, 10*b*, 11*a*, 11*b* of the magnet through the cover 3—4 and base 2 of the housing 1 by four non-magnetic screws 14.

It should now be apparent that the present invention provides a dual, frictionless method of and apparatus for electromagnetically obliterating or erasing previously recorded magnetic sound track.

What is claimed is:

1. An erasing head for demagnetizing a magnetic record, said head comprising: a magnetic structure having a longitudinal axis, a pair of substantially confronting spaced-apart pole portions disposed on opposite sides of said axis adjacent to one end of said structure and another pair of substantially confronting spaced-apart pole portions disposed on said opposite sides of said axis adjacent to the other end of said structure, one pole portion of each pair being offset longitudinally from the pole portion with which it is paired.

2. An erasing head in accordance with claim 1 and wherein said longitudinally offset pole portions are offset in the same longitudinal direction with respect to the pole portions with which they are paired.

3. An erasing head in accordance with claim 1 and wherein said longitudinally offset pole portions are offset a distance less than the longitudinal dimensions of the pole pieces with which they are paired.

4. An erasing head in accordance with claim 1 and wherein the space between one pole portion of each pair and the longitudinally offset pole portion with which it is paired is of a width greater than the thickness dimension of the magnetic record which said erasing head is designed to serve, whereby said record may be passed longitudinally through said spaces out of frictional contact with both said pairs of pole portions.

5. An erasing head in accordance with claim 1 and wherein said magnetic structure comprises a bi-part structure wherein the parts and the polar portions thereof are of substantially duplicate form and dimensions.

DALLAS R. ANDREWS.

REFERENCES CITED

The following references are of record in the file of this patent:

UNITED STATES PATENTS

| Number | Name | Date |
|---|---|---|
| 2,229,326 | Heller | Jan. 21, 1941 |

FOREIGN PATENTS

| Number | Country | Date |
|---|---|---|
| 691,711 | France | Oct. 24, 1930 |